United States Patent Office 3,507,516
Patented Apr. 21, 1970

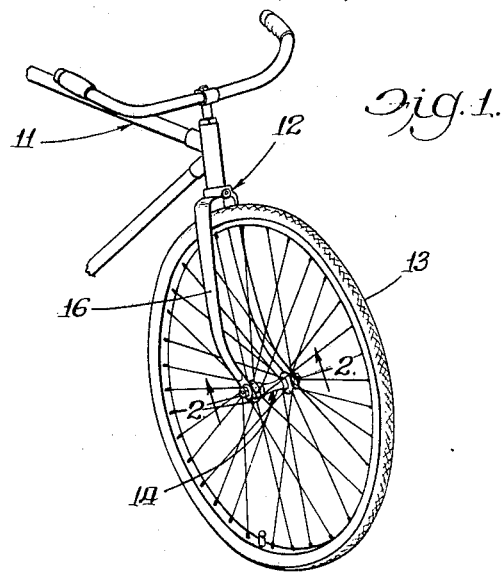
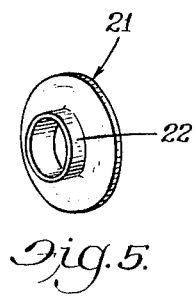
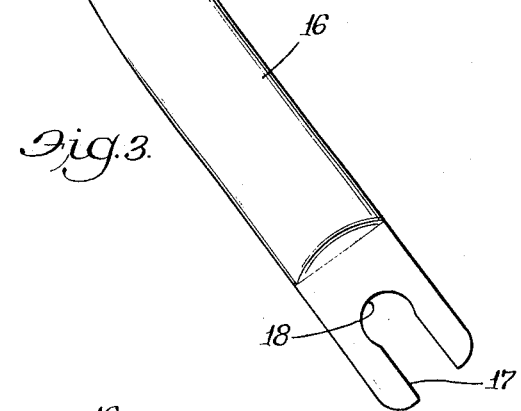
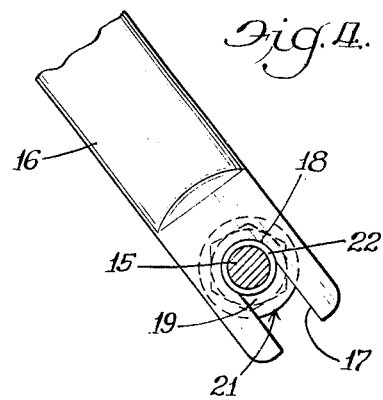
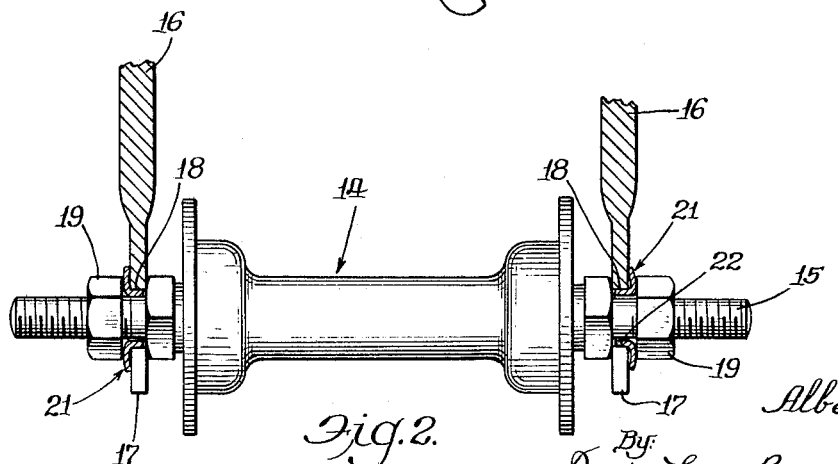
Inventor:
Albert J. Fritz
By: Davis, Lucas, Brewer & Brugman
Attys.

3,507,516
BICYCLE FRONT WHEEL SAFETY MOUNTING
Albert J. Fritz, Wilmette, Ill., assignor to Schwinn Bicycle Company, Chicago, Ill., a corporation of Illinois
Filed Mar. 26, 1968, Ser. No. 716,166
Int. Cl. B62k 25/00
U.S. Cl. 280—279                                     5 Claims

ABSTRACT OF THE DISCLOSURE

Slots in lower ends of front fork receive front wheels hub axle in usual manner, but upper ends of slots are provided with circular enlargement to receive laterally extending inner annular flange on concave or dished washer disposed on axle outwardly of fork to function as lock washer for outer axle nut and, by engagement of its annular flange in circular enlargement of fork slot, to prevent accidental displacement of the axle and wheel from the fork slots even if outer retaining or axle nuts become loose. Since annular flange of washer is interposed between axle and fork, weight of wheel, hub and axle assist in holding washer in operative position to prevent separation of wheel from fork.

BACKGROUND OF THE INVENTION

Field of the invention

This invention relates generally to cycles, and more particularly to the mounting of front wheel axles therefor in slots in the lower ends of their front forks.

Description of the prior art

For convenience of mounting the front wheel, hub and axle assembly, it is customary to provide slots in the lower portions of the fork of a bicycle which are open at their lower ends to receive the outer ends of the axle, with the axle being held in the upper ends of the slots by suitable retaining nuts threadedly mounted on the outer ends of the axle and lock washers, or the like. So long as these axle or retaining nuts remain tight, there are no difficulties, but if they, or one of them, accidentally loosens, the wheel, more than likely, will fall out of the fork when the bicycle is moved rearwardly or as a result of hitting a bump during forward travel, or otherwise, the fork is lifted. Serious accidents and attendant bodily injuries to riders have been attributed to just such separations of wheels from forks.

SUMMARY OF THE INVENTION

This invention substantially eliminates accidental separation of the front wheel axle of a bicycle from the slots in the fork, even though either or both of the retaining nuts on the outer ends of the axle become loose, by providing an enlargement at the upper end of each slot and a retaining member on the axle between each nut and the fork with flange means, preferably in the form of an inner annular flange, extending laterally into the enlarged portion of the adjacent slot, the slot being wide enough to receive the axle but too narrow to permit movement therethrough of the retaining member. Consequently, so long as such a retaining member is mounted on the axle with its flange means engaging or being disposed in the enlargement of the upper end of the associated slot, wheel-removing movement of the axle through the slots is positively prevented. And even though the axle nuts become loose, the weight of the wheel resists movement of the retaining members relative to the axle to assist in maintaining their flange means in operative position in the enlarged portions of the slots.

In the drawings:
FIGURE 1 is a perspective view of the front end of a cycle embodying the features of this invention;
FIG. 2 is a detail section taken longitudinally of the front axle substantially on the line 2—2 of FIG. 1 and on an enlarged scale;
FIG. 3 is a detail side elevational view of the lower end of one leg of the fork;
FIG. 4 is a view similar to FIG. 3, with the hub mounted in the fork and the axle in section, looking outwardly toward the inner or left side of the right hand leg in FIG. 2; and
FIGURE 5 is a perspective view of one of the retaining members or flanged washers.

DESCRIPTION OF THE PREFERRED EMBODIMENT

Referring to FIG. 1, reference numeral 11 indicates in general a cycle of any type having a fork 12 for receiving, and being supported by, a front wheel 13 which is provided with a hub 14 of suitable construction and including the usual axle 15. As is customary in such mechanism, the fork 12 comprises a pair of depending legs, 16, each of which has a slot 17 (FIGS. 2–4) slightly wider than the outer diameter of the axle 15 and extending lengthwise of the leg upwardly from its lower end to freely receive the axle.

The present invention includes the provision of an enlarged terminal portion 18 at the upper end of each fork slot 17 which is wider than the slot and preferably is formed by means of a circular punch or during the forming of the customarily flattened end of the fork and the associated slot 17.

The usual outer axle nuts 19 (FIG. 2) are screwed onto the threaded ends of the axle 15 and retaining means or members, indicated generally by reference numeral 21 (FIG. 5), also are mounted on the axle between each fork leg 16 and the associated nut 19. Each retaining member 21 preferably comprises a concave or dished metal lock washer and is provided with an inwardly extending flange means 22 preferably comprising an annular flange formed integrally therewith. The flanges 22 are dimensioned to be received in the enlarged portions 18 (FIG. 2), but their outer dimension is greater than the width of the slots 17 so as to prevent movement of the axle 15 lengthwise of the slots from its normal mounted position in FIG. 4.

It will be appreciated that the retaining members 21 could have the interior of their bores formed by the flanges 22 tapped, if desired, so as to be screwed onto the axle. It also will be understood that the enlarged upper terminal portions 18 of the slots 17 could be non-circular, so long as the retaining members are slidably onto the axle and their flanges 22 conform in outer dimensions and shape to such terminal portions 18. In any event, the disposition of the retaining members 21 on the axle 15 with their flanges engaging or being disposed in the enlargements 18 at the ends of the slots 17 positively prevents wheel-removing movement of the axle through the slots. Since such disposition of either retaining member 21 results in its flange 22 being frictionally held against the wall of the enlarged portion 18 or the upper end edges of the slot 17 intercepted thereby, disengaging movement of the retaining member relative to the axle is resisted, as by the weight of the wheel 13 when the fork 12 is lifted, to assure retention of the wheel in the fork.

It is thought that the invention and many of its attendant advantages will be understood from the foregoing description, and it will be apparent that various changes may be made in the form, construction, and arrangement of the parts without departing from the spirit of the invention or sacrificing all of its material advantages, the form hereinbefore described and shown in the drawings being merely a preferred embodiment thereof.

I claim:

1. A safety mounting for the wheel of a cycle having an axle, comprising a fork with depending legs each having a slot of a width to receive said axle extending lengthwise upwardly from the lower end thereof and terminating in an enlarged portion at its upper end, and retaining members slidably mounted on said axle outwardly of said fork having inwardly extending flange means engageable in said enlarged portion of the associated said slot and an outer dimension greater than the width of said slots to prevent movement of said axle lengthwise of said slots.

2. In a safety mounting according to claim 1, nuts mounted on the outer ends of said axle for resisting movement of said retaining members relative thereto.

3. A safety mounting according to claim 2, wherein said retaining members comprise washers additionally functioning to restrain outward movement of said nuts relative to said axle.

4. A safety mounting according to claim 3, wherein said flange means comprises an annular flange formed integrally with each said washer.

5. A safety mounting according to claim 1, wherein said flange means comprises an annular flange formed integrally with each said retaining member and interposed in operative position between said axle and said enlarged portion of the associated said slot, whereby the weight of the wheel resists movement of said retaining members relative to said axle to assist in maintaining the same in operative position.

References Cited

UNITED STATES PATENTS

| | | | |
|---|---|---|---|
| 399,456 | 3/1889 | Warwick | 308—192 |
| 614,232 | 11/1898 | Norton | 301—125 X |
| 1,090,381 | 3/1914 | Buster et al. | 280—279 |
| 1,401,032 | 12/1921 | Baker et al. | 280—276 |
| 2,073,736 | 3/1937 | Duffy | 308—192 |
| 2,459,658 | 1/1949 | Klein | 85—50 X |

KENNETH H. BETTS, Primary Examiner

U.S. Cl. X.R.

85—50; 301—125